(12) United States Patent
Gui et al.

(10) Patent No.: US 7,924,183 B2
(45) Date of Patent: Apr. 12, 2011

(54) METHOD AND SYSTEM FOR REDUCING REQUIRED STORAGE DURING DECOMPRESSION OF A COMPRESSED FILE

(75) Inventors: Jian Gui, Beijing (CN); Hong Jie Nie, Beijing (CN); John Turek, South Nyack, NY (US); Wei Ying Yu, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 12/464,628

(22) Filed: May 12, 2009

(65) Prior Publication Data
US 2009/0284400 A1 Nov. 19, 2009

(30) Foreign Application Priority Data
May 15, 2008 (CN) .......................... 2008 1 0099036

(51) Int. Cl.
*H03M 7/30* (2006.01)
(52) U.S. Cl. ........................................... 341/87; 341/51
(58) Field of Classification Search .................... 341/51, 341/87
See application file for complete search history.

(56) References Cited

U.S. PATENT DOCUMENTS

| | | | |
|---|---|---|---|
| 5,481,701 A * | 1/1996 | Chambers, IV | ..................... 1/1 |
| 5,875,270 A | 2/1999 | Nakamura | |
| 6,278,734 B1 | 8/2001 | Geib et al. | |
| 6,618,728 B1 | 9/2003 | Rail | |
| 2002/0029229 A1 | 3/2002 | Jakopac | |
| 2004/0190508 A1 | 9/2004 | Houghton et al. | |
| 2007/0016693 A1 | 1/2007 | Goodrich | |

OTHER PUBLICATIONS

Kai Xu, et al., "Error-Free Compression of Multispectral Image Data Using Linear Vector Prediction", Remote Sensing and Image Research, Chiba University Center.

* cited by examiner

*Primary Examiner* — Khai M Nguyen
(74) *Attorney, Agent, or Firm* — Matthew W. Baca; Diana L. Roberts

(57) ABSTRACT

A method and system for decompressing a compressed file is disclosed in this invention, the method comprising: reading a compressed data block from the compressed file; decompressing the compressed data block; outputting the decompressed data for storage into a decompressed file; deleting the compressed data block that was decompressed from the compressed file. The proposed method and system in this invention can reduce the unnecessary repeated data between compressed data and decompressed data. The storage space requirement will be reduced during decompression, and the existing compression/decompression algorithms need not be changed by using this invention. Thus, this invention is easy to be integrated into existing compression/decompression tools.

11 Claims, 7 Drawing Sheets

| ...... | No. i Block | Compression flag | No. i+1 Block | Compression flag | ...... |

METHOD AND SYSTEM FOR REDUCING REQUIRED STORAGE DURING DECOMPRESSION OF A COMPRESSED FILE

TECHNICAL FIELD

The present invention generally relates to computer software technology, and particularly to a method and system for reducing storage demand during decompression of a compressed file.

BACKGROUND OF THE INVENTION

File compression is a process that encodes information in an original file so that the information in the original file could be expressed with fewer bits. Compression is very useful because it helps to reduce the consumption of expensive resources, for example, hard disk space while storing information, transmission bandwidth while transmitting information, etc. Due to the demand of reducing the consumption of resources, the compression technique has been developed quickly, and a lot of compression algorithms have been proposed. Different compression formats are utilized in different compression algorithms, such as ZIP, RAR format in Microsoft® Windows® operating system, gz and bz format for Linux®/Unix® operating system.

Multiple files can be compressed into a single file by file compression. However, when compressing a plurality of files, or compressing a very large file, the compressed file will still be quite large. The compressed file needs to remain unchanged in the storage device (such as hard disk or tape) during the decompression process. Therefore, in order to decompress a compressed file with size S, double S size storage is required before finishing the decompression. This storage requirement is difficult to be satisfied for a large compressed file.

Several solutions for reducing the required storage for decompression have been proposed in existing technology. One solution is to delete the compressed data after the decompression is completed. A typical example of this solution is bunzip2 in Linux. By default, it will automatically delete the compressed file after its decompression is completed.

The second solution is to selectively decompress the compressed file. WINRAR® in Windows® operating system is an example of this solution. It allows the user to browse the files in a compressed data without decompressing it. Furthermore, if one or more files in the compressed file is selected and opened, the decompression will be started directly.

In the aforementioned two solutions, decompressed files are stored in the storage device. However, for the data in some special fields, such as banking transaction data, monitoring data of petroleum industry, meteorological data, scientific computing data, multimedia data, etc, the size of data are extremely large, as well as the compressed backup files. For example, a 100 G bytes database in the seismic field is very common. Such extremely large compressed backup files would need very large storage when decompressing, without considering the storage used by the decompressed file itself.

SUMMARY OF THE INVENTION

Therefore, there is a need to provide a method and system which can reduce the required storage during decompression, thus solving the existing problem.

According to one aspect of this invention, there is provided a method for decompressing a compressed file, comprising:
reading a compressed data block from the compressed file;
decompressing the compressed data block;
outputting the decompressed data for storage into a decompressed file;
deleting the compressed data block which has been decompressed from the compressed file.

According to another aspect of this invention, there is provided a system for decompressing a compressed file, comprising:
inputting means for reading a compressed data block from the compressed file;
decompressing means for decompressing the compressed data block;
outputting means for storing the decompressed data into a decompressed file; and
deleting means for deleting the compressed data block that was decompressed from the compressed file.

The proposed method and system in this invention deletes redundant information between compressed data and decompressed data when doing decompression, thus reduces required storage space during decompression.

BRIEF DESCRIPTION OF THE DRAWINGS

The foregoing and other objects, features and advantages of the invention will be apparent from the following more particular descriptions of exemplary embodiments of the invention as illustrated with reference to the accompanying drawings wherein like reference numbers generally represent like parts of exemplary embodiments of the invention.

FIG. 9b illustrates the process for deleting the compressed data corresponding to the decompression process shown in FIG. 9a.

DETAILED DESCRIPTION OF THE INVENTION

Embodiments of the present invention will now be described more fully hereinafter below in more detail with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In the existing compression technology, the original compressed file remained unchanged in the storage (such as hard disk or tape) during the decompression process. If the original compressed file is too large, there would not be enough storage for decompression, which would lead to the failure of decompression.

A method for reducing required storage during decompression of a file is proposed in this invention, in which the compressed data is divided into several data blocks during the decompression process. Each data block has the same size, or a different size selected by the user, such that the data that has already been decompressed can be deleted from the compressed file during the decompression process, and thus the required storage will be reduced accordingly.

Figure 1:
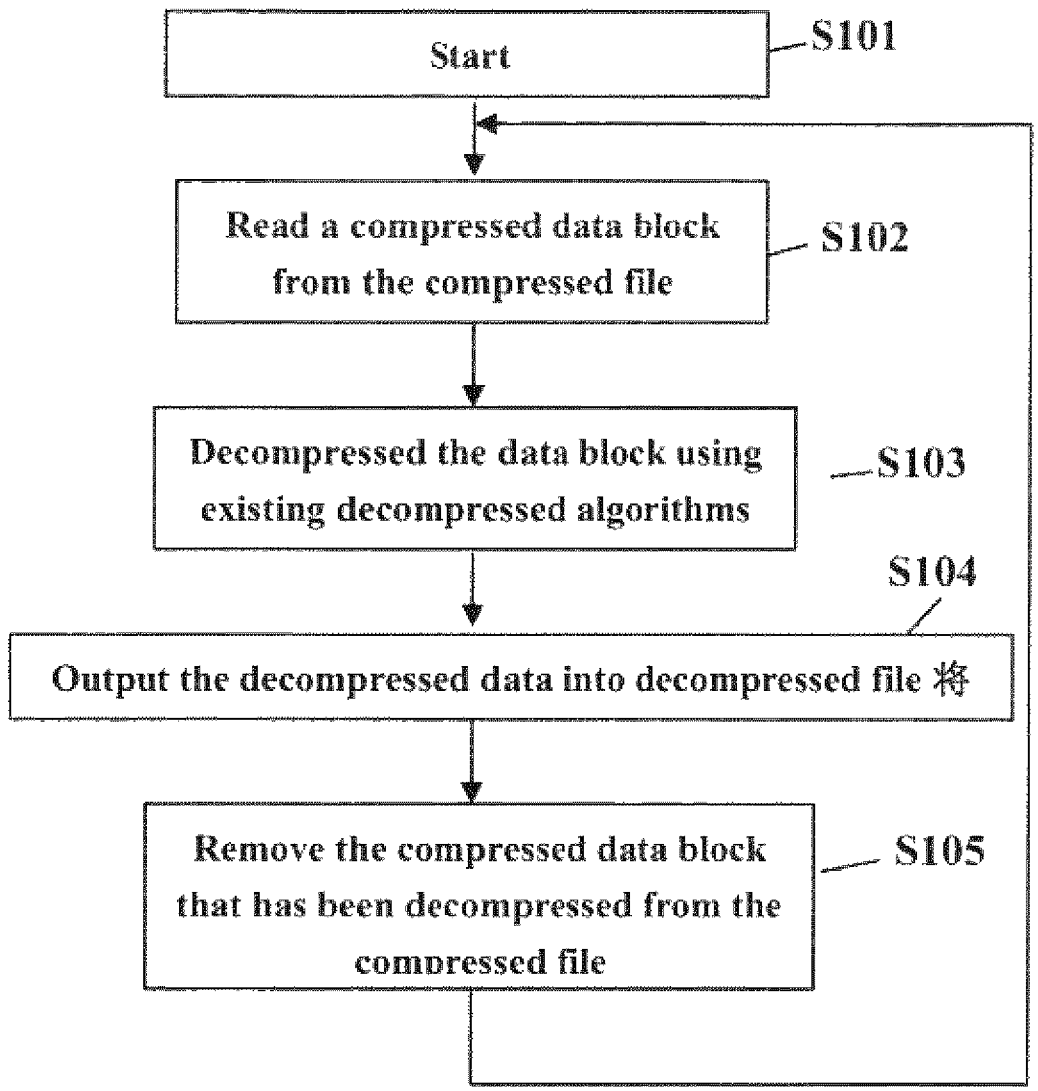
FIG. 1 illustrates a preferred decompression process according to one embodiment of the present invention.

FIG. 1 illustrates a decompression process according to one embodiment of the present invention, which can reduce the required storage during the decompression process. In FIG. 1, the decompression process starts in step S101. The start step can also be considered as an initialization process, in which users can get data block information, or divide the data into blocks, etc. Assume that the size of the entire compressed data (the size of the compressed file) is M. In step S102, a compressed data block is read from the compressed file. Assume that the size of the compressed data block is M1 (where M1<M). In step S103, the compressed data block is decompressed using an existing decompression method. In step S104, the decompressed data is output into the decompressed file. Assume that the size of the decompressed data block is N1, and the size of the decompressed data is N (where N1<N). Then, in step S105, the data block, which was decompressed (size M1), is deleted from the compressed file (size M). The process returns to step S102, where the next compressed data block is read and decompressed. From the above description of decompression process, it can be seen that the storage occupied by the original compressed file reduces continually, and the storage occupied by the decompressed file increases accordingly. When the number k of compressed data blocks are read, the size of storage occupied is: M−M1−...−Mk+N1+...+Nk, which is less than the size of storage M1+...+Mk occupied using existing technology. When all the compressed data has been decompressed, the storage occupied by the compressed file will be released using this method and the size of storage occupied will be N, which is M less than the storage occupied using existing technology.

Due to the particularity of the compression method and decompression method, the data relativity will be used in the compression or decompression method. Therefore, there are detailed requirements to implement the above method, for example, how many blocks should the data be divided into, and how should each data block be processed. Four different solutions are proposed below to implement the method in FIG. 1. Of course, one skilled in the art will readily recognize that other alternatives exist within the scope of the invention. How the data block is divided will not affect the implementation of this invention. As such, the detailed embodiments described in this application will not limit the scope of this invention, rather such scope will be defined by the attached claims.

Solution 1:

In this solution, the original data is divided into data blocks for future decompression when compressing. The data blocks are independent of each other. Thus, each original data block can be compressed independently and all the compressed data blocks can be merged together to form the "compressed data". Also, information on how the data blocks were divided is recorded into the compressed data. When decompressing, each compressed data block can be decompressed independently based on the recorded data block information in the compressed file. Once a data block is decompressed, the compressed data block can be deleted from the original compressed file so as to reduce the storage occupied by the original compressed file when decompressing.

The size of each data block can be specified by the user. For example, all data blocks may be of the same size or, alternatively, each may have a different size. A default size may be used, such as, for example, 1 MB. It is well-known to those skilled in the art, that the smaller the data blocks are, more reduction in storage occupied by the original compressed file will be achieved. However, the compression efficiency will also be reduced as well, in that more independent data blocks will reduce the correlation among data blocks. Therefore, users may divide the data into data blocks with flexibility based on their own requirements.

The data block information is stored into the compressed file using one of multiple formats during the compression process. For example, the data block table, shown in Table 1 below, may be utilized for storing the data block information, which may be placed at the start, end, or any part of the compressed file. In Table 1, each data block occupies a row, which comprises data block ID, the size of the data block, and the address offset of the data block in the compressed file. Optionally, the start address and the end address of the data block, or other related information, may be stored in this table, by which the start address and the end address of the data block in the compressed file can be concluded. Of course, other information may be stored in the Table if necessary.

TABLE 1

| Data block table | | |
|---|---|---|
| ID of data block | Size of data block | Address Offset of data block |
| 0 | 0x472A | 0x00000000 |
| 1 | 0x5D24 | 0x0000427A |
| 2 | 0x4057 | 0x00009F9E |
| ... | ... | ... |

Figure 2:
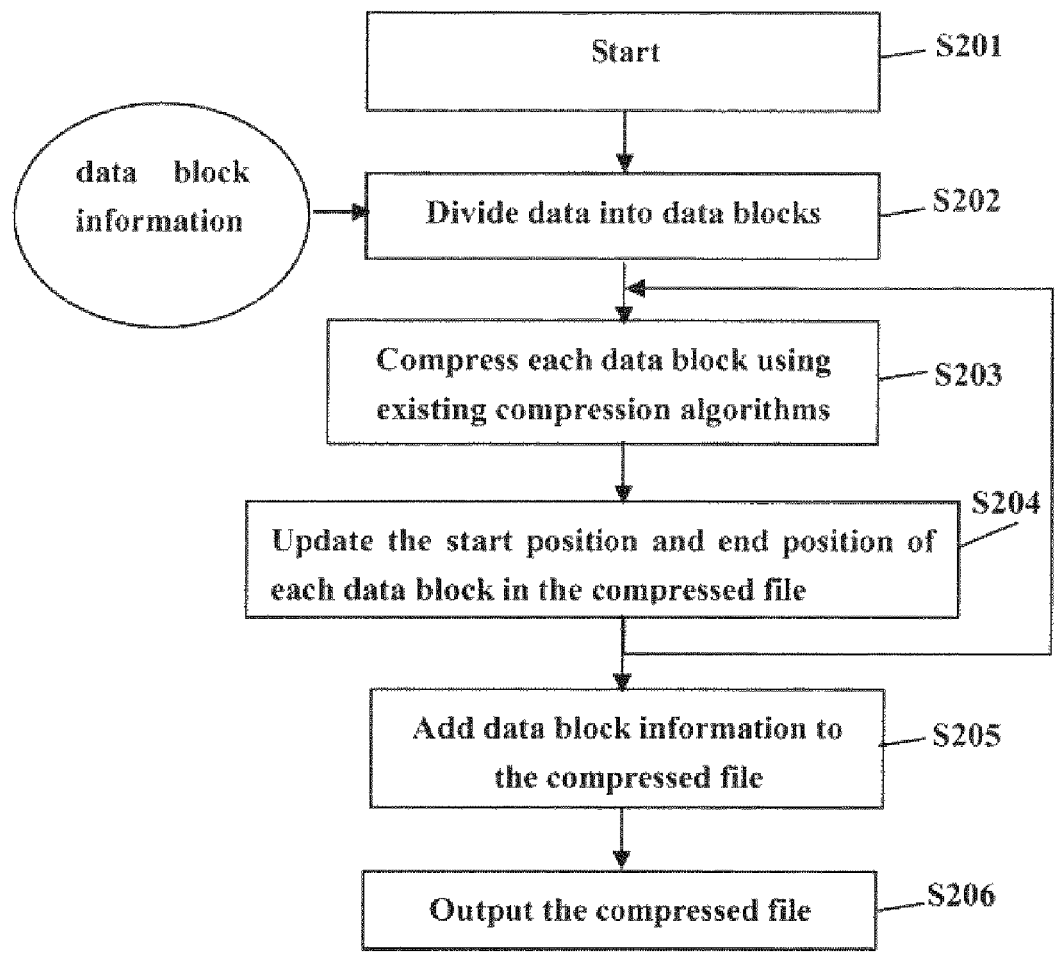
FIG. 2 illustrates a compression process based on dividing to-be-compressed data into data blocks.

FIG. 2 illustrates a compression process using data blocks, in which the compression process starts in step S201. In step S202, the data is divided into data blocks. The data may be divided either based on the data block information received from user or automatically. For example, the size of each data block may be set to 1 MB.

In step S203, each data block is compressed using an existing compression algorithm and outputted to the compressed file, so as to get its position in the compressed file, including the start address offset and end address offset. Next, in step S204, the start address offset and end address offset of each data block in the compressed file will be updated. Then, in step S205, the data block information is added to the compressed file. Finally, the compressed file is outputted in step S206, and the data block compression process is finished.

Figures 3, 4:
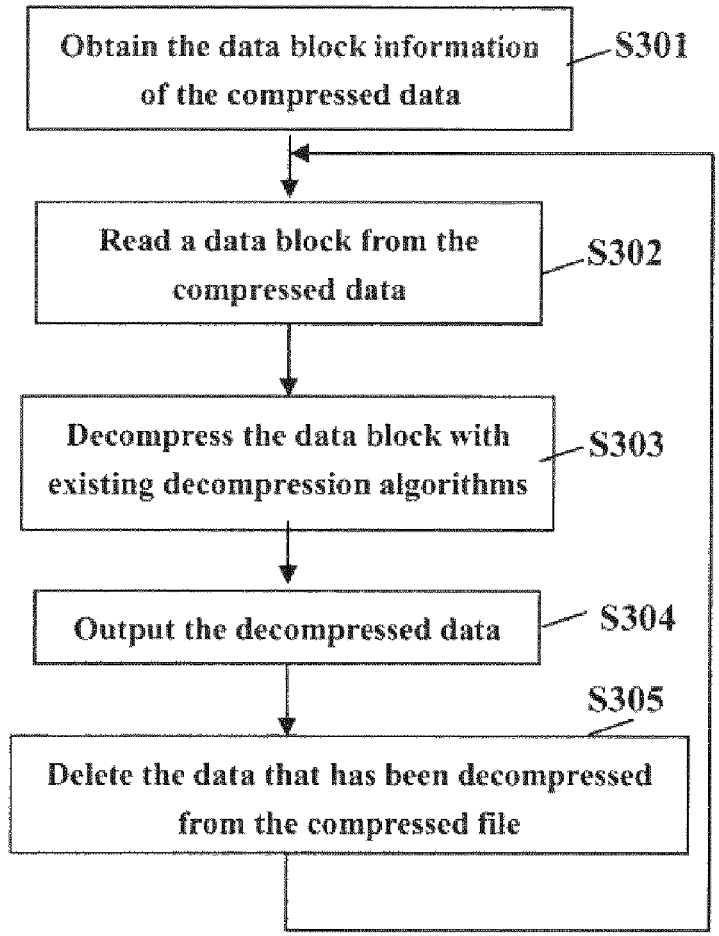
FIG. 3 illustrates a decompression process corresponding to the compression process shown in FIG. 2.
FIG. 4 illustrates the compressed data with compression flags.

FIG. 3 illustrates the decompression process corresponding to the compression process shown in FIG. 2. In the process of FIG. 3, in step S302, the data block information of the compressed data is obtained, which is different from FIG. 1, while the other steps are consistent with and correspond to the steps in FIG. 1. Accordingly, the other steps are omitted here.

In this way, the purpose to reduce the storage occupied by the original compressed file during decompression can be achieved by dividing data into data blocks when compressing, and decompressing the compressed data blocks based on the data block information and deleting the compressed data that have been decompressed step by step. This technical solution does not depend on specific compression algorithms, that is, any compression algorithm may be used in this solution.

Solution 2:

In this solution, the same compression method of data blocks as in solution 1 is utilized. However, the data block information for decompression is not stored directly into the compressed file. Rather, compression flags are placed into the compressed file to provide the data block information indirectly. The data between any two compression flags is believed to be compressed by blocks independently without correlation. FIG. 4 illustrates the compressed data with compression flags.

Figure 5:
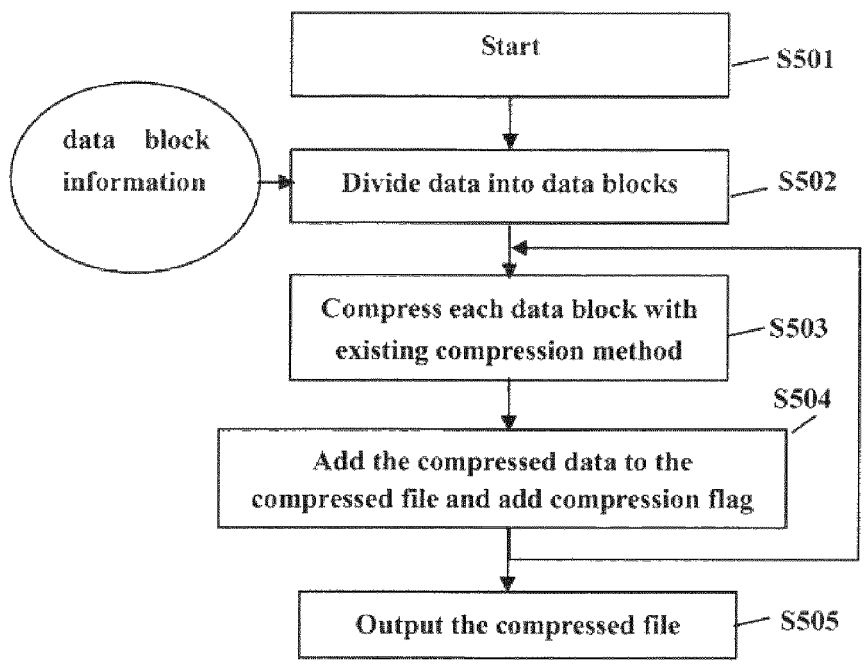
FIG. 5 illustrates the process for compressing data and generating compression flags.

FIG. 5 illustrates the process for compressing data and generating compression flags. Compared with FIG. 2, steps S204 and S205 have been updated as step S504, in which after the compressed data are added to the compressed file, compression flags are added; other steps, such as step S201 and step S501, step S202 and step S502, step S203 and step S503, step S206 and step S505 are the same respectively, and they are omitted here.

Figure 6:
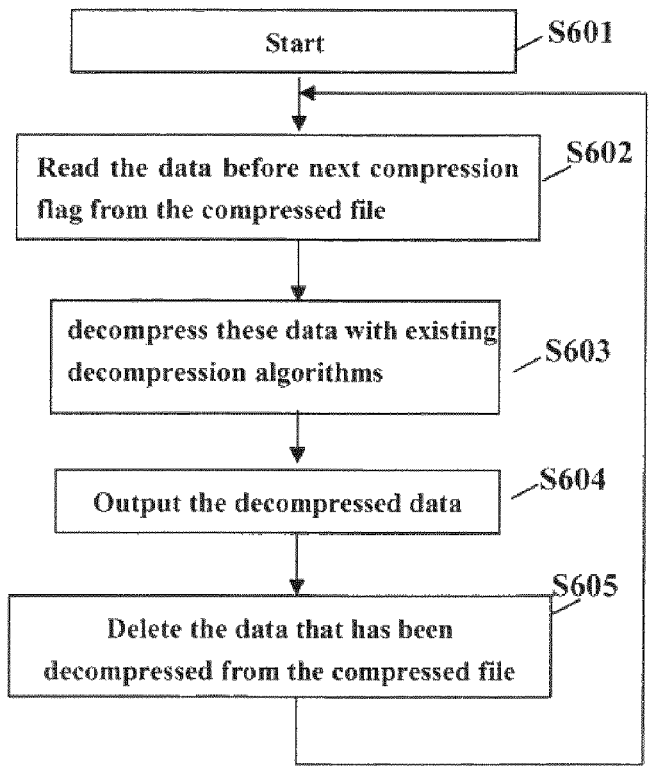
FIG. 6 illustrates a decompression process corresponding to the compression process shown in FIG. 5.

FIG. 6 illustrates the decompression process corresponding to the compression method shown in FIG. 5. In this solution, the data read from the compressed file is the data between two compression flags, shown in step S602. Other steps, such as step S101 and step S601, step S103 and step S603, step S104 and step S604, step S105 and step S605 are the same, which are omitted here.

This technical solution does not depend on the compression algorithms, that is, any compression algorithm may be used in this solution.

Solution 3

In order to explain this technical solution, the following definitions need to be defined:

Decompression data buffer: the data buffer is a memory area in the storage, which is used as a buffer during the decompression process. The data buffer can either be a fixed size, such as 1 MB, or set up to a suitable range by a user. Different data buffer sizes can be used according to different decompression algorithm. The size of the data buffer corresponds to the size of the data block in FIG. 1, and the decompression data buffer is used by the decompression algorithm to decompress the data therein.

It should be noted that the data correlation is always utilized in data decompression algorithms, thus when the data is being decompressed in the decompression data buffer, it is possible that not all the data in the data buffer can be decompressed. That is, the last part of the data in the data buffer may not be decompressed correctly because part of the correlated data has not been read into the decompression data buffer.

Address Offset of the Input Data (OFFSET in short): it is possible for the data in the decompression data buffer to be decompressed partially. Therefore, when the compressed data is read into the decompression data buffer at the next iteration, there is a need to read the data that was not decompressed during the last iteration, into the decompression data buffer again. OFFSET is defined as the address offset from the start of the decompression data buffer to the compressed data that has not be decompressed. In other words, the data between address 0 and Address OFFSET has been decompressed correctly. If the OFFSET is equal to the size of the decompression data buffer, then all the input data has been decompressed correctly.

After the data in a decompression data buffer has been decompressed totally or partially, it is time to consider the compressed data that has been decompressed in the compressed file. If the compressed data will not influence the later decompression process, it can be deleted from the compressed file; otherwise, the compressed data can be stored into another data structure for further usage, but it can be deleted from the storage, such as the hard disk. In the decompression algorithm, correlation with previous data could be represented to have a dependent relationship with the foregoing compressed data, or to have a dependent relationship with the decompressed data of the foregoing compressed data. The corresponding dependent data to different compression algorithm should be stored into another data structure.

Figure 7:
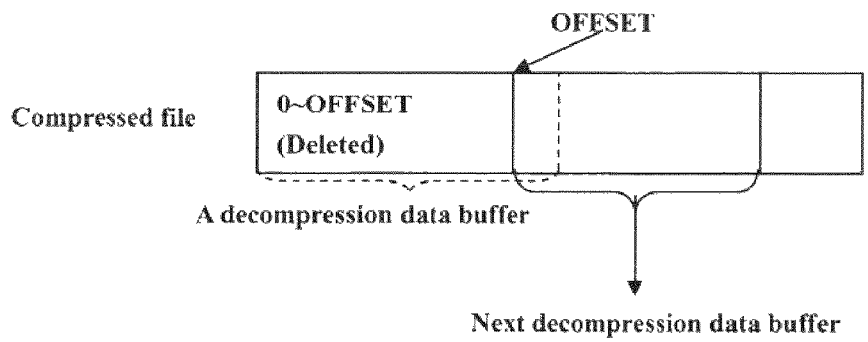
FIG. 7 illustrates the relationship between the decompression data buffer and the OFFSET of input data.

FIG. 7 illustrates the relationship between the decompression data buffer and OFFSET in the compressed file.

Figure 8:
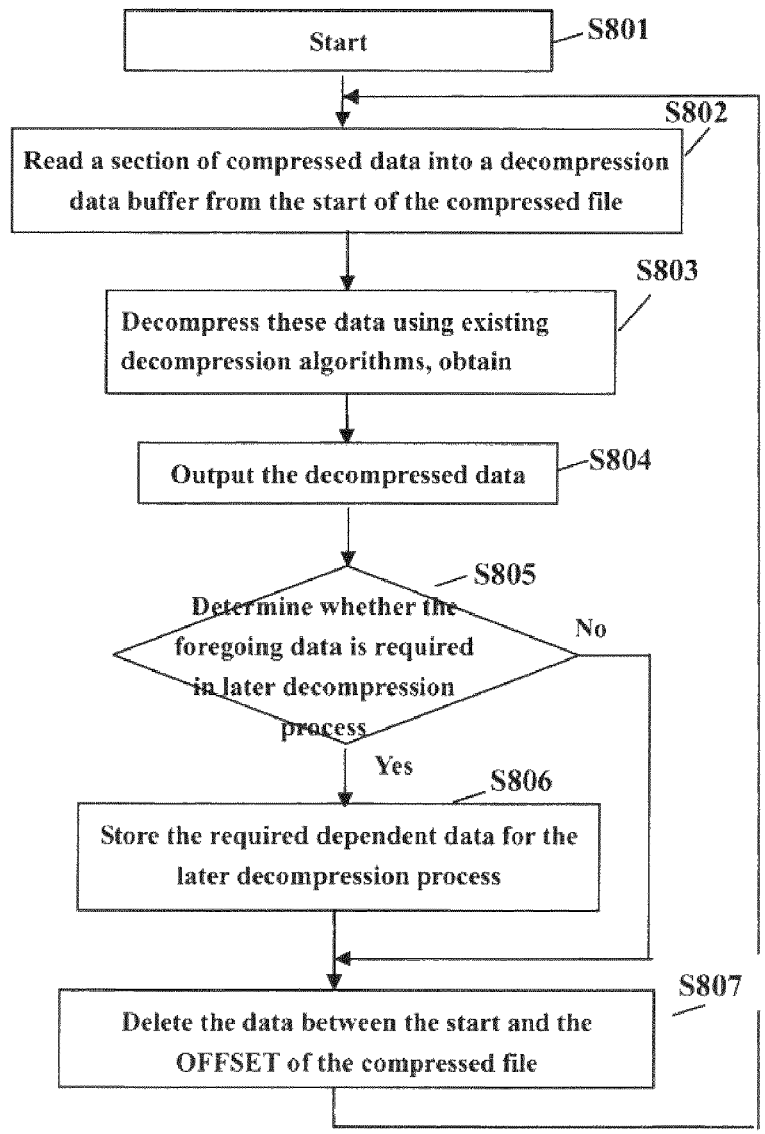
FIG. 8 illustrates the decompression process in solution 3.

FIG. 8 illustrates the decompression process in solution 3. The process starts in step S801. In step S802, a portion of the compressed data is read into a decompression data buffer from the start of the compressed file, wherein the decompression data buffer corresponds to the data block shown in FIG. 1. The buffer size can be fixed or set by the user. Then, in step S803, the data read from the compressed file is decompressed using an existing decompression method and the OFFSET is obtained. The data addressed from 0 to OFFSET has been decompressed completely, but there is a requirement in step S805 to determine whether the foregoing data is required in later decompression process. If required, in step S806, the required foregoing data (i.e. dependent data) addressed from 0 to OFFSET is stored using another data structure, and then the process enters step S807. Otherwise, the process enters step S807 directly. In step S807, the data between the start of compressed file and the OFFSET is deleted. The step S804 can only be executed after step S803, but can be executed before any steps between step S803 and step S807, and even can be executed after step S807 within the cycle.

In the following, compression algorithm DEFLATE will be used as an example to illustrate the technical solution. Compression algorithm DEFLATE is the combination of compression algorithm LZ77 and Huffman Coding, and is used widely by zip, gzip, zlib, and png files. In compression algorithm DEFLATE, the repeated string can be compressed first by compression algorithm LZ77 (Note: the string here is not limited to the string that can be displayed, but is an arbitrary bit stream), then Huffman Coding is used in the later compression.

In short, the compression algorithm is regarded as a string matching algorithm. For example, a string is repeated in a segment of text, and can be expressed as the pointer of the string shown in the forgoing text. Of course, the precondition of this algorithm is that the pointer is shorter than the string.

The text string to be compressed are:

Blah blah blah blah blah!
1,2, ... 6

After LZ77 scan, the result is: Blah b[D=5, L=18]!

Wherein the string "lah b" repeats, thus the compression algorithm LZ77 uses [D=5,L=18] (It is commonly believed as string pointer) to compress a later repeated string. Here, D denotes distance, L denotes length, and the meaning is that 18 characters from the inserted point where [D, L] is inserted (the 7th character) are the same with the 18 characters from "the inserted point minus D", e.g.

Blah blah blah blah blah!
1,    7      ...    24!

The 18 characters from the inserted point are "lah blah blah blah".

The 18 characters from "the inserted point minus D" are "lah blah blah blah".

Because D is limited as a maximum of 256 bytes in compression algorithm LZ77 (need 8 bits), the L can be a maximum 32K bytes (needs 15 bits), then totally it needs 23 bits to present one match [D,L], i.e. 3 bytes. Therefore, if the length of the repeated string is more than 3 bytes, the data can be compressed.

In order to reduce the information redundancy, the compression algorithm DEFLATE does Huffman Coding for the scanned result from the compression algorithm LZ77. The first part of the Huffman tree of the compressed data comprises two Huffman trees, one is used to code the string and its length, the other is used to code D in the inserted [D, L].

Before decompressing the file, two Huffman trees are read into memory to build Huffman trees for decompression. (Usually, the information in Huffman trees is much less than the information in the compressed data). Then, the compressed data are read (the data using Huffman coding) for decompression. From the rule of Huffman coding, each Huffman code exclusively identifies information, thus, a Huffman code can be deleted from the compressed file after being identified by the compression application.

A simple example about Huffman coding is shown here:
The string to be coded is: ABBBACDCAA
Wherein A(4) B(3) C(2) D(1) represent that A repeats 4 times, B repeats 3 times, C repeats 2 times, while D repeats once.
Its Huffman coding is shown as below:

```
                    x(10)
              x(6)        A(4)
                  x(3)    B(3)
         D(1)    C(2)
         A: 1
         B: 01
         C: 001
         D: 0000
```

The compressed string based on Huffman coding is:
10101011001000000111 (totally less than 3 Bytes)
If Buffer=10 bit, shown as below

```
              1010101100100000 0111
                  ^=10th Bit
```

The last identified Huffman code between 0 to buffer end is:

```
              1 01 01 01 1 0 0100000 0111
                      ^=9th Bit
```

Because the foregoing 8 bits have been successfully decompressed, they can be deleted, e.g. OFFSET=8 bit; but there are 2 bits between OFFSET and Buffer end which have not been decompressed, thus they should be input to next Buffer.

Solution 4:

The key point in this solution is that during decompression, the TO-BE-REMOVED flags will be inserted into the original compressed file, which indicates that the data before this flag has been decompressed and can be deleted. Therefore, the process can decompress the original compressed file, and delete the content that has been decompressed in the original compressed file at the same time, so as to reduce the occupied storage during decompression.

During the decompression process, this technical solution comprises two processes, one is a decompression process, and the other one is a deleting process. These two processes are parallel processes, and information is exchanged by TO-BE-REMOVED flags.

Figure 9A:
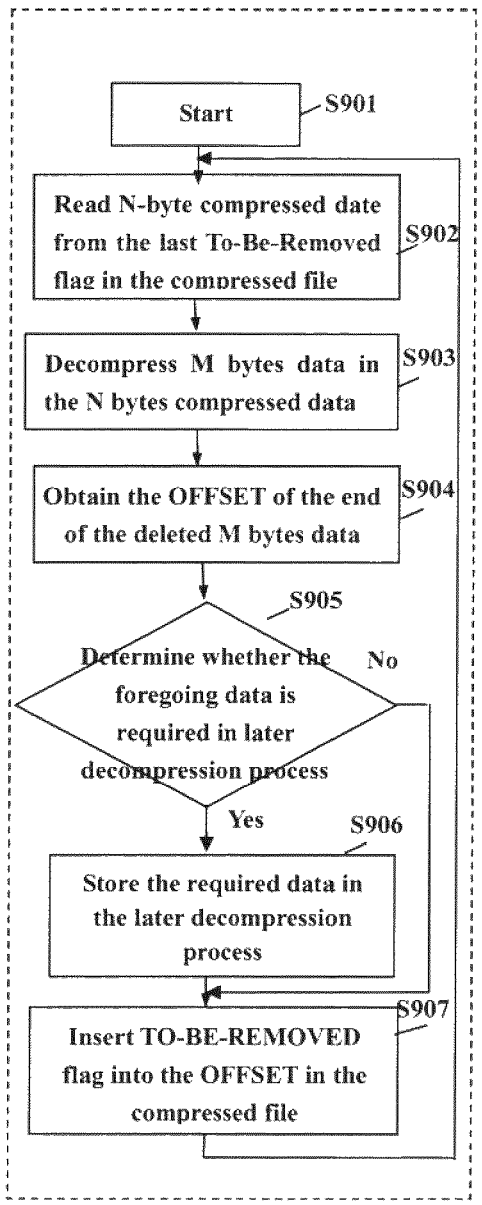
FIG. 9a illustrates a decompression process according to one embodiment of the present invention.

FIG. 9a illustrates a decompression process according to one embodiment of the present invention. First, in step S901, the decompression process starts, in which the data is decompressed by block. Suppose that the size of the block is N, then in the step of S902, the process reads N bytes compressed data from the last To-Be-Removed flag in the compressed file. For the first block, due to no To-Be-Removed flag, a To-Be-Removed flag may be added to the start of the compressed file, and then the processing for this data block can be the same as the other blocks. In step S903, M bytes of data in the N bytes of compressed data is decompressed. As described in technical solution 3, when decompressing the compressed data in the decompression data buffer, it is possible that not all compressed data can be decompressed, and maybe the last part has not been decompressed because its related data has not been read into the decompression data buffer. Therefore, only M bytes in the block with size N bytes have been successfully decompressed (M less or equal N). Afterward, in step S905, whether the foregoing data is required in later decompression process is determined. If yes, the data required in the later decompression process is stored using other memory space, and step S907 begins. Otherwise, then step S907 begins directly in which a TO-BE-REMOVED flag is inserted into the offset address in the compressed file. Before step S907, there is a need to execute step S904, in which the offset address of the end of the deleted M bytes data is obtained. Step S904 can be executed in any step that is after step S903, and before step S907. In this way, an independent decompression process can run solely, in which multiple TO-BE-REMOVED flags have been inserted into the original compressed file to indicate that the data between two flags can be deleted.

Figure 9B:
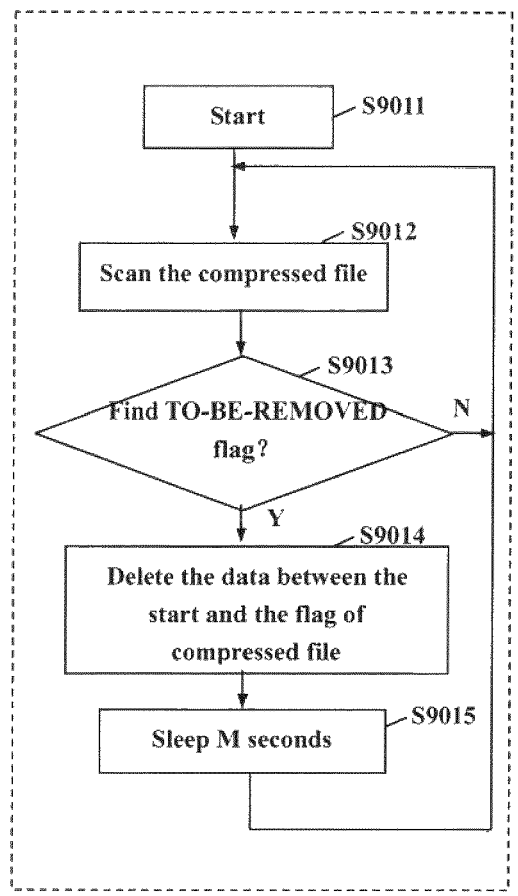

FIG. 9b illustrates the compressed data deletion process corresponding to the decompressing process shown in FIG. 9a. In step S9011, the process starts, and in step S9012, the compressed file is scanned. Then, in step of S9013, it is determined whether a TO-BE-REMOVED flag is found. If yes, the process enters step S9014, in which the data between the start of the compressed file and the flag is deleted, then the compressed file is continued to be scanned in step S9012. If CPU resource is considered, it can sleep M seconds and scan the compressed file again. If it is determined that no flag is found in step S9013, then in step S9012, the compressed file can be scanned continuously.

Figure 10:
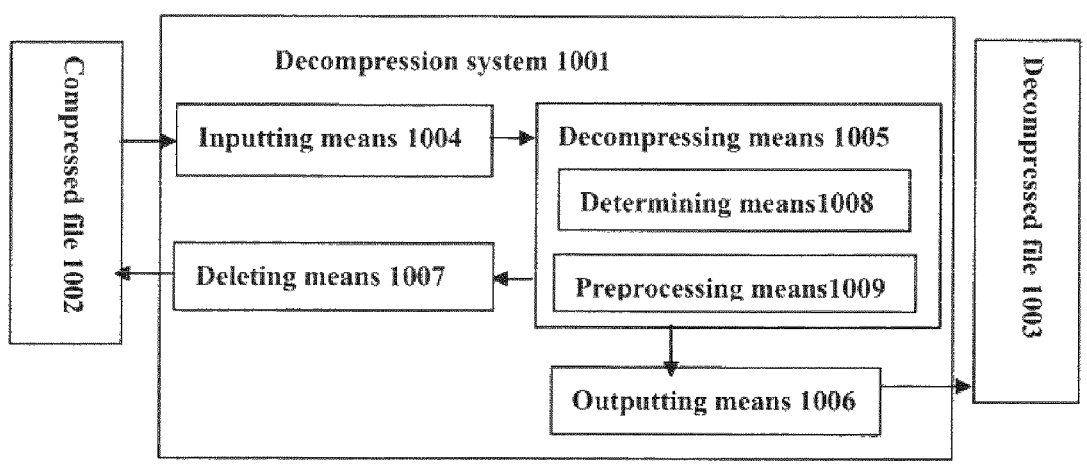
FIG. 10 illustrates the decompression system according to one aspect of the invention.

Based on the same concept of the invention, FIG. 10 illustrates the decompression system according to the invention. The system comprises inputting means 1004, decompressing means 1005, outputting means 1006, and deleting means 1007. Inputting means 1004 is for reading a compressed data block from the compressed file 1002; decompressing means 1005 is for decompressing the compressed data block; outputting means 1006 is for storing the decompressed data into a decompressed file 1003; and deleting means 1007 is for deleting the compressed data block that has been decompressed from the compressed file 1002.

In one embodiment, the compressed file comprises block information of the compressed data. Optionally, the block information is denoted as a data block table or a compression flag between data blocks in the compressed file.

In another embodiment, the compressed file 1002 is compressed by data blocks, and there is no relationship between any two blocks.

In yet another embodiment, the decompression means 1005 further perform obtaining only a part of decompressed data of the compressed data block when decompressing the compressed data block; Adding the remaining compressed data that was not decompressed into the next data block to be decompressed.

In still another embodiment, the decompressing means 1005 further perform: determining means 1008 for determining whether the later decompressing process need the foregoing data; preprocessing means 1009 for storing the needed foregoing data needed by the later decompressing process in response to the need of forgoing data in later decompressing process.

In but another embodiment, when decompressing the compressed data in decompression data buffer, it is possible that not all compressed data can be decompressed, and perhaps the last part has not been decompressed because its related data has not been read into the decompression data buffer. At this point, the remaining compressed data, not being decompressed in the data block, is denoted by the data address offset.

In still another embodiment, the decompression means 1005 adds TO-BE-REMOVED flag into the compressed file 1002 to indicate that the data before the flag can be deleted. Then, the deleting means 1007 and other means (including inputting means 1004, decompressing means 1005 and outputting means 1006) work stand alone, and exchange information through the TO-BE-REMOVED flag, so as to delete the data which has been decompressed completely from the compressed file 1002.

It should be pointed out that the modules in the system of this invention can be implemented by hardware circuit such as Very Large Scale Integrated Circuit or gate array, semiconductors such as logic chips and transistors, or programmable hardware device such as field programmable gate array, programmable logic device, or by software executing on various types of processors, or by the combination of above hardware circuit and software.

The present invention also provides a program product, which comprises the program code implementing the above methods and medium for storing the program code.

Although the illustrative embodiments have been described herein with reference to the accompanying drawings, it is to be understood that the present invention is not limited to those precise embodiments, and that various other changes and modifications may be affected therein by one of ordinary skill in the related are without departing from the scope or spirit of the invention. All such changes and modifications are intended to be included within the scope of the invention as described by the appended claims.

We claim:

1. A computer-implemented method for decompressing a compressed file having a plurality of compressed data blocks, comprising:
    reading a compressed data block from the compressed file;
    decompressing the compressed data block;
    outputting the decompressed data for storage into a decompressed file;
    deleting the compressed data block that was decompressed from the compressed file in the decompressing step; and
    repeating the above steps until there are no more compressed data blocks to be read.

2. The method as recited in claim 1, wherein the decompressing step and deleting step may occur in parallel after the first iteration.

3. The method as recited in claim 1, wherein each data block to be deleted is identified in a data block table that identifies a start and stop address of each compressed data block, the table being located in the compressed file, or by a plurality of compression flags located between the data blocks in the compressed file.

4. The method as recited in claim 3, wherein there is no relationship between a size of any two blocks.

5. The method as recited in claim 3, wherein in the decompressing step, the compression flags are added into the compressed file to indicate that data positioned before a particular flag can be deleted.

6. The method as recited in claim 1, wherein the decompressing step further comprises:
    decompressing only a portion of the compressed data block in a decompression data buffer; and
    adding remaining compressed data, from the compressed data block that was not decompressed, into the next data block to be decompressed.

7. The method as recited in claim 6, wherein the remaining compressed data not being decompressed is denoted by a data address offset in the compressed file.

8. A system, having a processor and storage coupled thereto, for decompressing a compressed file having a plurality of compressed data blocks, comprising:
    a processor for reading a compressed data block from the compressed file stored in storage;
    the processor for decompressing the compressed data block;
    the processor for outputting the decompressed data into a decompressed file; and
    the processor for deleting the compressed data block, that was decompressed from the compressed file, wherein the above steps are repeated until there are no more compressed data blocks to be read.

9. The system as recited in claim 8, wherein the processor further performs:
    the processor for decompressing only a portion of the compressed data block in a decompression data buffer; and
    adding remaining compressed data, from the compressed data block that was not decompressed, into the next data block to be decompressed.

10. The system as recited in claim 9, wherein the remaining compressed data not being decompressed is denoted by a data address offset in the compressed file.

11. The system as recited in claim 8, wherein each data block to be deleted is identified in a data block table that identifies a start and stop address of each compressed data block, the processor locating the table in the compressed file, or by a plurality of compression flags located between the data blocks in the compressed file, the processor adding the compression flags into the compressed file to indicate that the data before a particular flag can be deleted.

* * * * *